United States Patent

[11] 3,618,844

| [72] | Inventors | John D. Morley<br>Bay City;<br>William F. Salbenblatt, Saginaw, both of Mich. |
|---|---|---|
| [21] | Appl. No. | 790,185 |
| [22] | Filed | Oct. 24, 1968<br>Division of Ser. No. 563,971, May 31, 1966, Pat. No. 3,511,961 |
| [45] | Patented | Nov. 9, 1971 |
| [73] | Assignee | Newcor, Inc.<br>Bay City, Mich. |

[54] STRIP POSITIONING DEVICE
14 Claims, 18 Drawing Figs.

[52] U.S. Cl. ............................................. 228/4,
219/82, 228/5, 228/44

[51] Int. Cl. ............................................. B23k 1/00,
B23k 37/04

[50] Field of Search ............................................. 219/78, 79,
82, 83, 161; 228/4, 5, 6, 15, 44, 8, 47

[56] References Cited
UNITED STATES PATENTS

| 2,957,071 | 10/1960 | Cooper et al. | 219/82 |
| 3,298,587 | 1/1967 | Seeloff et al. | 228/5 |
| 3,355,077 | 11/1967 | Woodward | 228/5 |
| 3,355,079 | 11/1967 | Ellis | 228/47 |
| 3,370,771 | 2/1968 | Shay | 228/8 |
| 3,458,103 | 7/1969 | Davis | 228/5 |
| 3,465,118 | 9/1969 | Senn et al. | 219/101 |
| 3,475,580 | 10/1969 | Morley | 219/82 |
| 3,510,045 | 5/1970 | Petros et al. | 228/5 |

Primary Examiner—John F. Campbell
Assistant Examiner—R. J. Craig
Attorney—Woodhams, Blanchard and Flynn ABSTRACT: A positioning mechanism for a clamp in a strip welding machine having a platform with slide means and means reciprocably supporting the slide means thereon. Means are provided for reciprocating the slide means and the slide means has at least one contact surface thereon arranged at an acute angle to the path of the slide means. A carriage is provided for supporting the clamp and guide means are provided on the platform for supporting the carriage for movement transversely of the slide means. At least one contact surface, fixed with respect to the carriage is provided and is slideably engaged with the contact surface on the slide means for causing the carriage to reciprocate along the guide means in response to reciprocation of the slide means.

INVENTORS
JOHN D. MORLEY
WILLIAM F. SALBENBLATT
BY
Woodhams, Blanchard & Flynn
ATTORNEYS

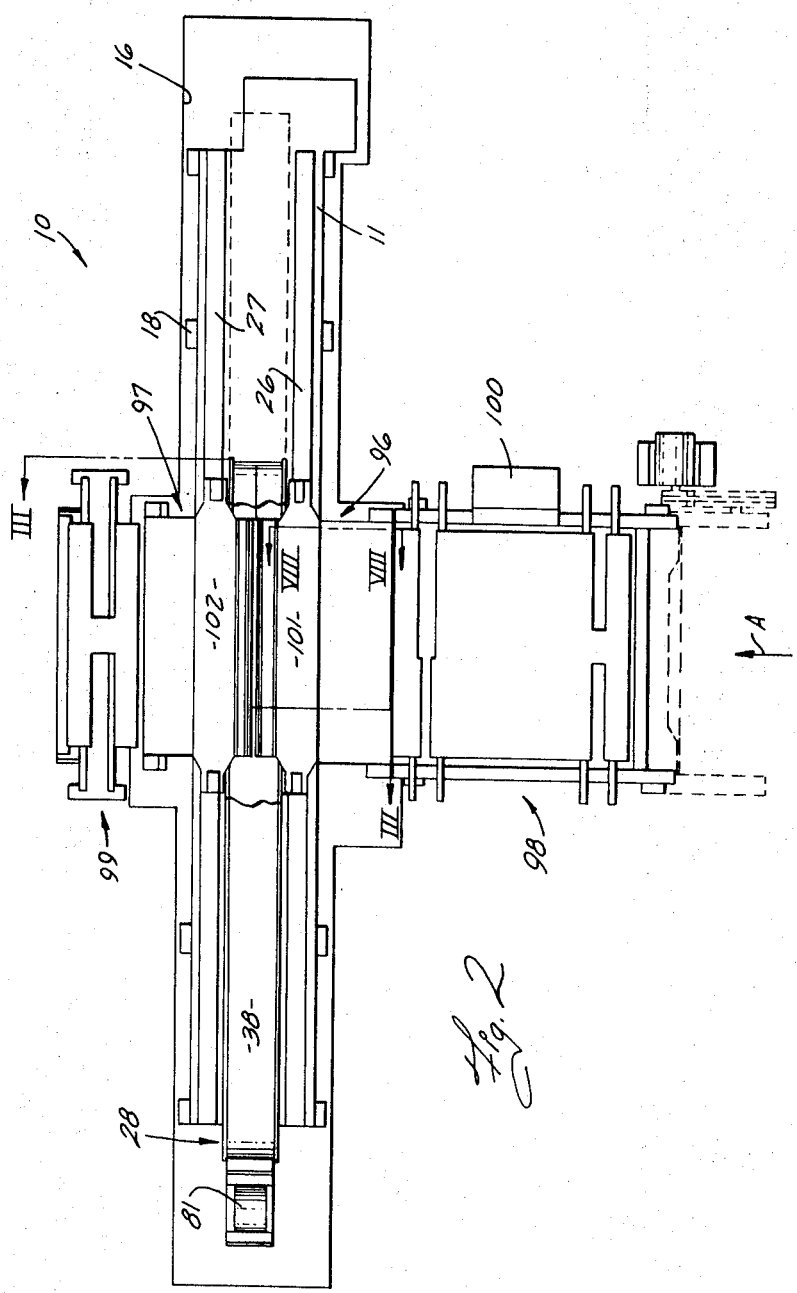

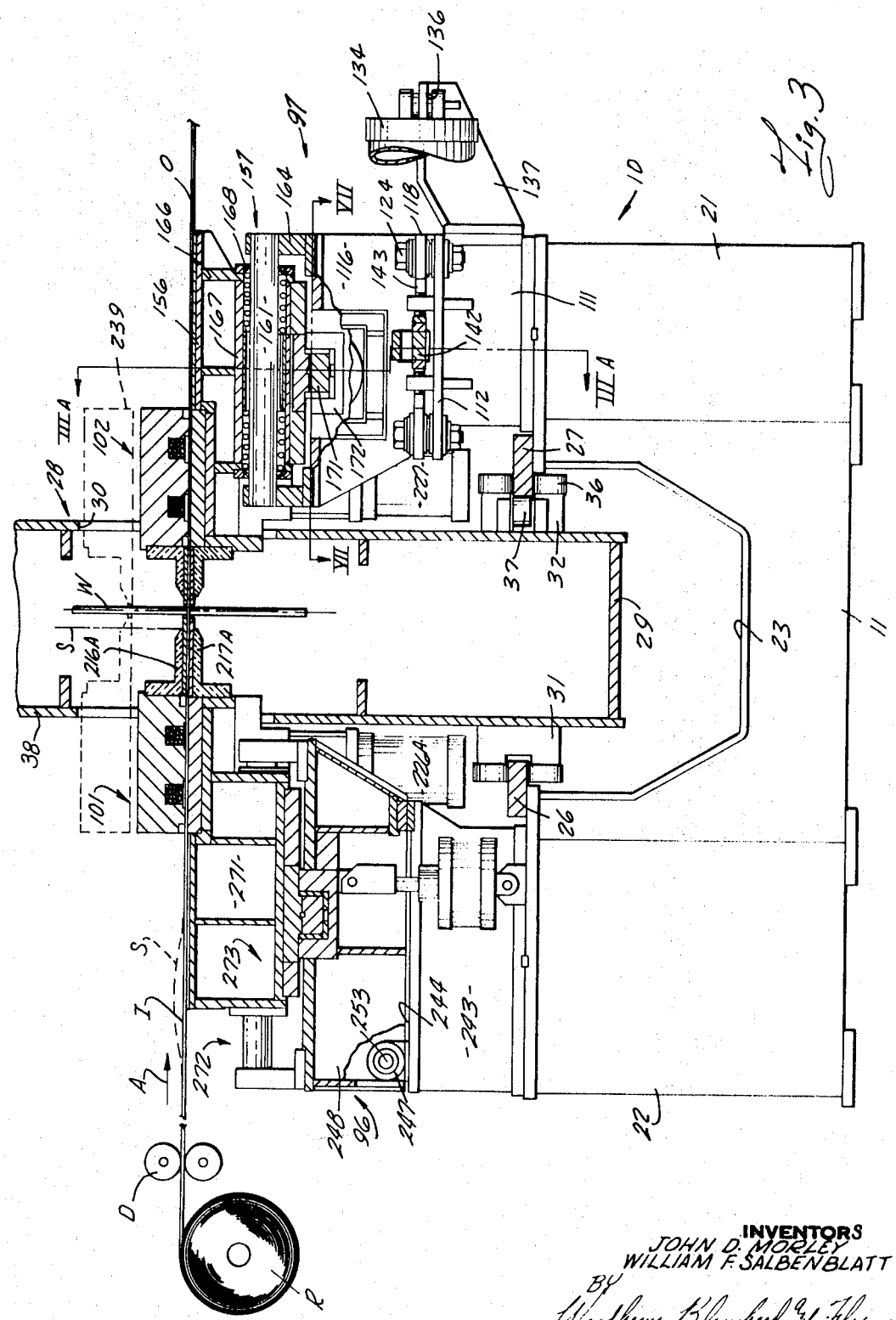

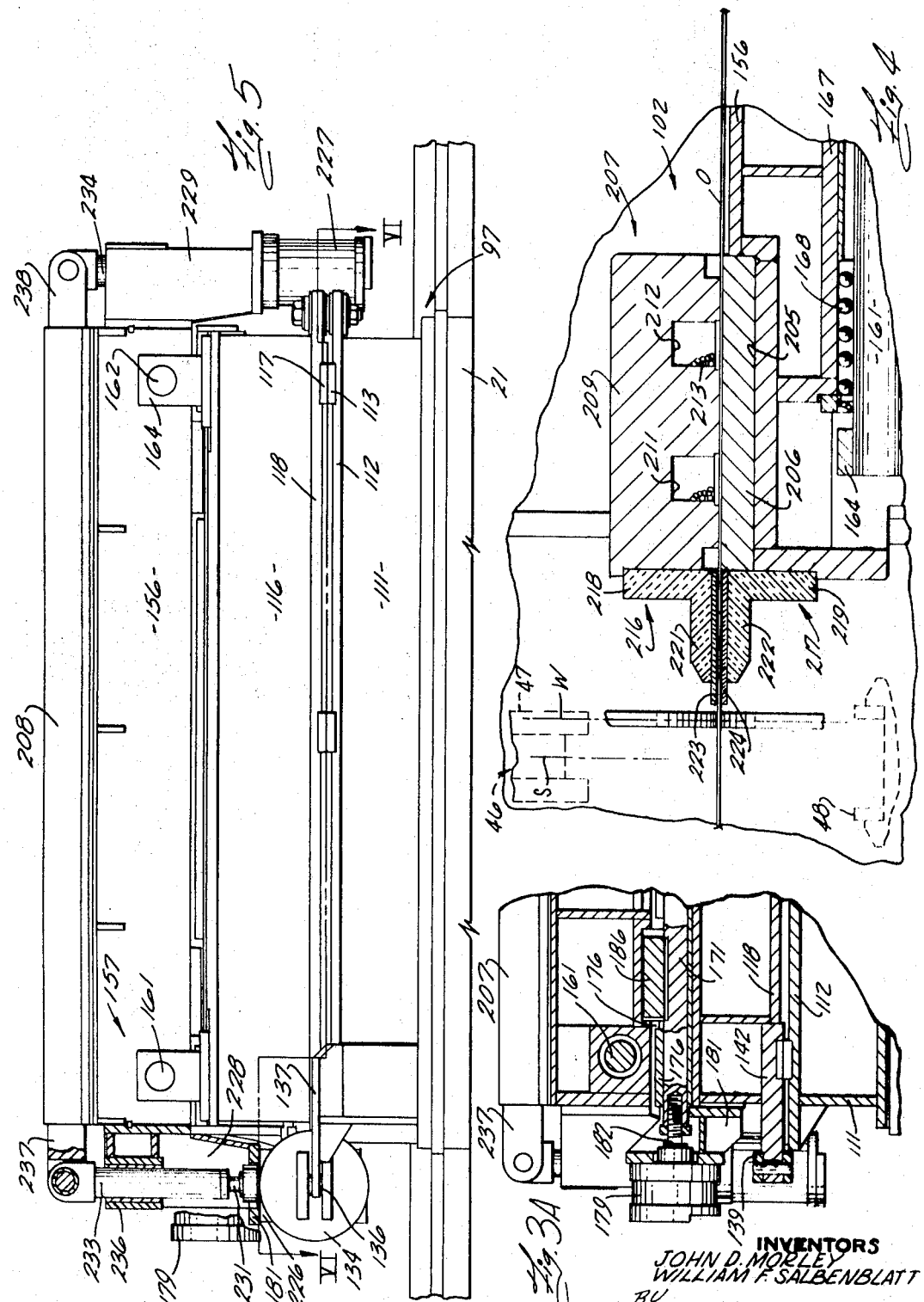

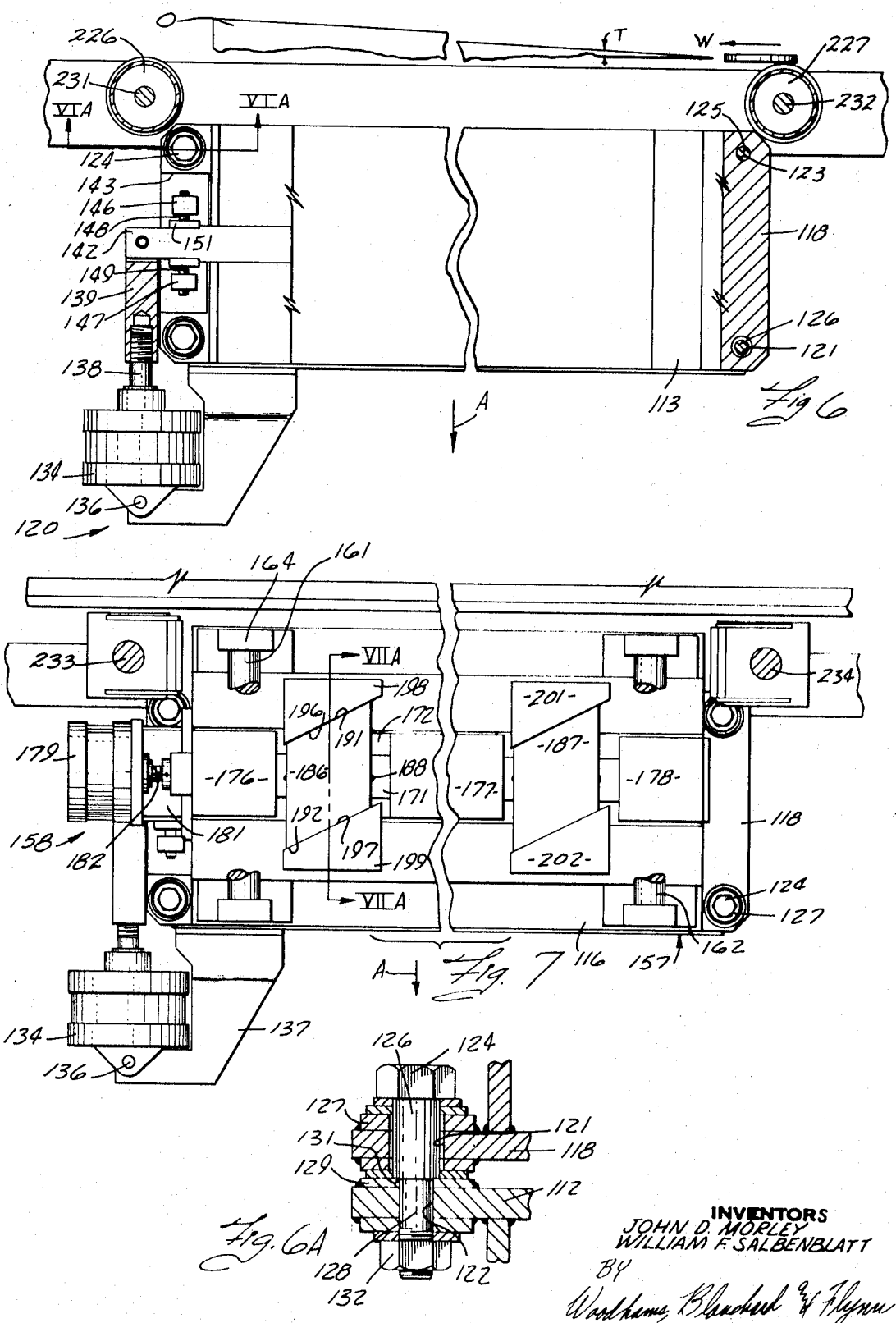

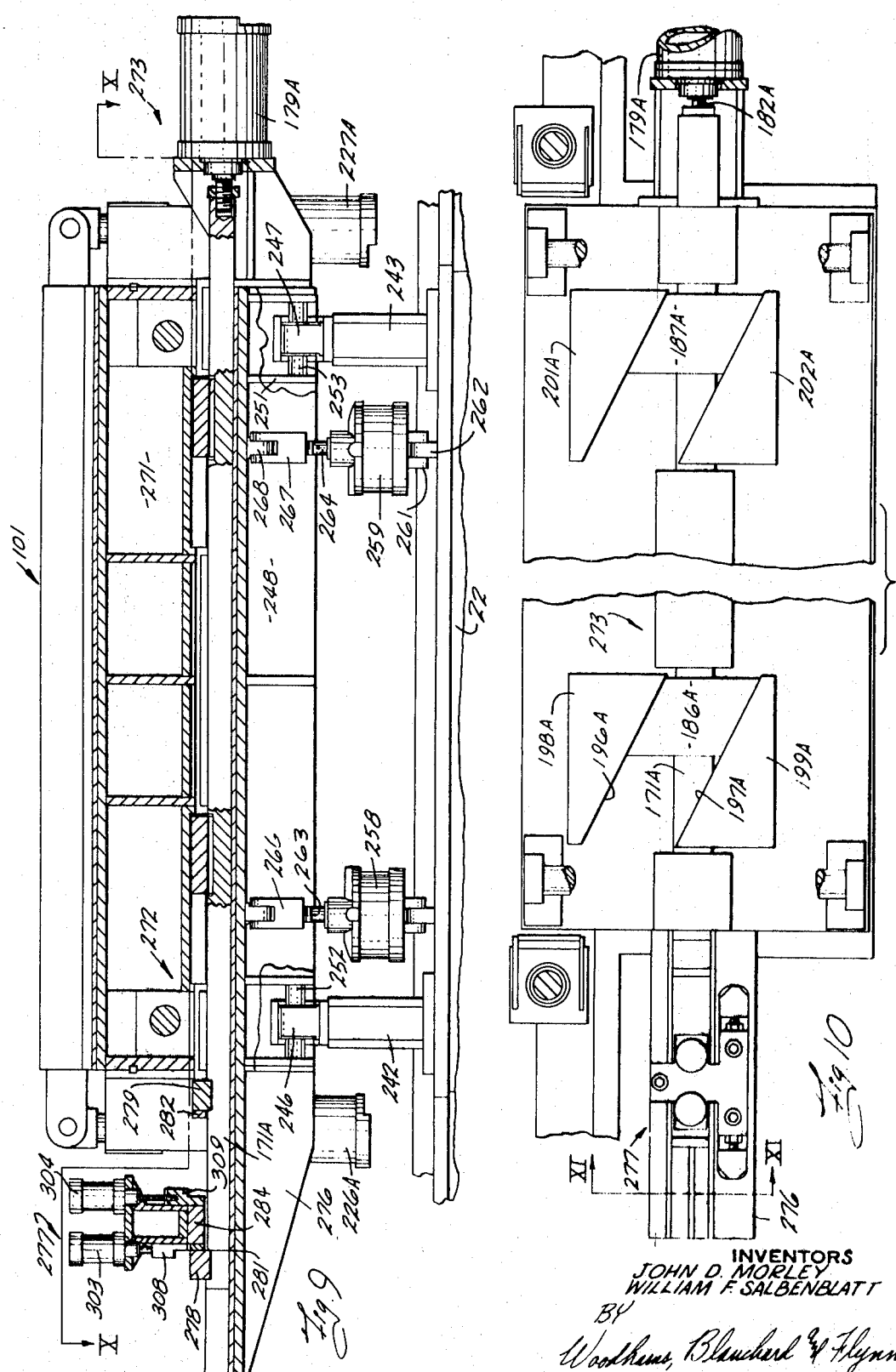

INVENTORS
JOHN D. MORLEY
WILLIAM F. SALBENBLATT
BY
Woodhams, Blanchard and Flynn
ATTORNEYS

STRIP POSITIONING DEVICE

This application is a division of our copending application Ser. No 553,971 filed May 31, 1966 now U.S. Pat. No. 3,511,961.

This invention relates to a welding machine and more particularly relates to an improved machine for rapidly welding together the ends of succeeding, finite length strips to produce a continuous elongated strip.

There is substantial need for strip and welding machines capable of satisfactory use with high speed, continuous processing devices of various kinds for steel strip material. Such machines are intended to add to the end of a steel strip being processed a further strip as the initial strip is being moved continuously through the processing device. More particularly, such machines are intended to form, in effect, an unbroken strip input to the processing device by sequentially adding new rolls of strip material, as required, to the strip passing through the processing device. Normally, the tail end of the strip going into the processing device is stopped so that the head end of a new strip can be welded thereto, a suitable amount of slack being provided between the tail end and portion of the strip moving in the processing device to allow such stoppage of the tail. However, the relatively high-strip speeds, for example, several thousand feet per minute, used in modern processing devices of various kinds require that welding the head of the new strip of material to the tail of the strip being processed be done very quickly since only a limited amount of slack can be provided between the welding zone and the processing device and hence, only a very limited amount of time is available for welding.

Known machines of this general type are normally provided with clamps for holding together the ends of the strips to be welded, a device for trimming the ends to be welded and means for welding the ends of the strips in an overlapped position. However, prior strip end welding machines of this general type have not been completely satisfactory on a number of counts.

For example, the strip end clamps used in prior machines to position the strip ends for trimming and welding have in general been unsatisfactory The strip ends are desirably overlapped only by a relatively small amount in order to minimize the extra thickness of the finished sheet at the weld seam. Particularly high clamping forces are required during welding to prevent the strip ends from shifting from their overlapped condition in response to pressures and side forces exerted thereon by welding electrodes. Difficulty has arisen from this need for high clamping forces. Reaction-type devices, including pressure fluid cylinders, screw jacks or the like, have not been fully satisfactory for developing the clamping force, since the reaction force imposed upon the frame of the machine thereby during clamping is very high. As a result, therefore, machines using reaction-type clamping devices most either have excessively heavy frames to backup the clamping device or suffer deformation as the result of clamping.

Electromagnetic clamps avoid the above-mentioned problem but introduce further difficulties. More specifically, placement of an electromagnetic clamp near the welding position changes the induction thereat and will cause losses, primarily eddy current losses. If on the other hand, the clamp is placed far enough from the welding zone to avoid such losses, it is then possible for the pressure of the welding electrodes to push the strip ends apart and cause buckling of the strip ends.

In machines of this general type, it is common practice to clamp and trim the head and tail edges of the strips to be joined and then to move the clamps toward each other to bring the trimmed edges into overlapping relationship for welding. Slack must be provided in the incoming strip to allow movement of the entry clamp toward the weld position, the incoming strip normally being of substantial length and being wound on a large roll which has considerable rotation inertia. Inasmuch as the clamp moving mechanism is not normally constructed to overcome such inertia, extra mechanism has in the past been provided the needed slack in the entering strip.

For example, in one known machine a lifting device is pivotally mounted below the strip. Upon actuation, the device rotates upwardly against the bottom of the strip and raises the adjacent portion above its normal plane of travel to form a hump therein, thus producing the required slack. This arrangement is however, disadvantageous in that it requires an extra mechanism which adds cost, complexity and maintenance problems.

It is customary in machines of this general type to provide clamps which equal or exceed the width of the strips to be joined so that the strips can be clamped across their entire width in a positive manner. In reciprocating the clamps between spaced positions for welding and shearing, it is highly desirable that both sides of the clamp and hence of the clamped portion of the strip be moved identically to avoid any cocking or twisting of the clamped strip portion due to cocking of the clamp. The simple provision of a pair of axially aligned pressure fluid cylinders on opposite sides of the clamp carriage is generally unsatisfactory due to the difficulty of synchronizing the movements of the pressure fluid cylinder pistons precisely enough to prevent cocking of the clamps as they are reciprocated.

It is normally desired that the strips to be welded be coplanar during welding except for the overlapped end portions thereof so that after planishing of the welded seam the finished workpiece will be planar.

Early strip and welding machines were in general designed to weld the ends of relatively narrow strips. More recently, however, it has become desirable to provide machines capable of joining relatively wide strips. Furthermore, it is, as just mentioned above, desirable to overlap the strip ends to be welded by only a minimum amount. The amount of overlap in fact may be of the same order as the strip thickness. It has been found, in overlap welding wide strips, that the degree of overlap diminishes in front of the welding electrodes as they move across the lapped strip ends. It has been found, for example, that an initial 0.050-inch overlap of a pair of 0.05-inch thick strip ends may diminish on a 6-foot wide strip by about 0.020 inch at the end of the seam, i.e., the overlap may diminish by as much as 40 percent of the initial overlap through the length of the seam. Such change in overlap is regarded as too large and would tend to result in poorly welded sections in the joint since weld current density (which controls unit area weld heat) increases as overlap decreases. Moreover, the characteristics of the joint will be changed, and the joint may have, together with reduced strength, reduced thickness in the zone of reduced overlap.

In the past there has been some difficulty when the same machine is used to weld thin strips together and, alternatively, to weld together thicker strips. The difficulty arises from the fact that less overlap can be tolerated with relatively thin strips than with thicker ones while retaining reliable completion of joints of satisfactory strength. At the same time, it is generally desirable that overlap be no greater than necessary for satisfactory seam strength since additional overlap material adds to the thickness of the joint to an undesirable extent. Thus, if the normal overlap used on thick strips is provided for thin strips, the completed weld seam will be too thick. On the other hand, if the overlap normally used for thin strips is used for thick strips, the probability of an unsatisfactory weld rises sharply due to insufficient overlap.

Accordingly, the objects of this invention include provision of a welding machine for welding together the overlapped ends of successive strips passed therethrough and particularly adapted for welding strip ends of substantial width.

A further object is to provide a welding machine, as aforesaid, which is of simplified and improved construction, which can be produced at cost at least competitive with known machines of the same general type, which will be capable of reliable operation over a long operating life and which will require little or no maintenance, such maintenance being readily accomplished by persons generally acquainted with devices of this general type.

A further object of this invention is to provide a welding machine, as aforesaid, having an improved clamp for clamping the strips in a fixed position during welding thereof.

A further object of this invention is to provide a clamp, as aforesaid, which is held closed by means of a magnetically generated force, in which the magnetic material and any windings of the clamp are spaced substantially from the welding zone, in which the clamp does not materially affect the inductance at the welding position, in which losses including eddy current losses at the welding position resulting from effects of the clamp are substantially eliminated.

A further object of this invention is to provide a clamp, as aforesaid, which positively prevents buckling of the strip between the clamped portion thereof and the welding position but which does not tightly grip the strip between the clamped portion thereof and the welding position.

A further object of this invention is to provide a clamp, as aforesaid, which is capable of supplying the high clamping force required to hold a strip for narrow overlap welding but which imposes no corresponding reaction force on the welding machine and thus allows for relatively light machine construction.

A further object of this invention is to provide a welding machine, as aforesaid, in which a clamp is provided on the entry side of the machine (i.e., the side of a machine receiving the head end of a new strip), in which means are provided for moving the clamp along the axis of the incoming strip and in which the clamp moving means is capable of advancing the incoming strip to a position for welding after the end of the strip has been trimmed.

A further object of this invention is to provide a welding machine as aforesaid, including an improved mechanism which is arranged for reciprocating the clamps toward and away from the welding position, which maintains the same rate of motion on both sides of the clamp and of the strip with high precision, which maintains the length of travel at the opposite ends of the clamp with respect to the direction of its travel, which prevents unintended cocking of the strip and during movement thereof by the clamp and which precisely locates the clamp transversely of its direction of travel.

A further object of this invention is to provide a clamp reciprocating device, as aforesaid, which is operable from one side of the strip by a single motive source such as a pressure fluid cylinder, which requires little room on the machine axially of the strip, in which requires relatively little room in direction to right angles of the plane of the incoming strip, in which the clamp reciprocating means includes synchronized, positive means for displacing each end of the clamp and in which the clamps can be made to reciprocate between limiting positions along the strip very rapidly.

A further object of this invention is to provide a welding machine, as aforesaid, including means for positively controlling the extent to which the strips to be joined are overlapped and in which the means controlling the extent of overlap are associated with the clamp reciprocating device.

A further object of this invention is to provide a welding machine, as aforesaid, including pivoting means supporting at least one clamp which is capable of cocking at least one of the strips slightly with respect to its normal path for shearing and then returning the strip to a normally aligned position to increase the overlap at the terminal end of the seam to be welded or is alternatively actuable to allow the strips to be trimmed with square ends and to relatively cock said strips in a manner to increase the overlap at the terminal and of seam to be welded so as to compensate for the tendency of the strip ends to lose overlap during welding.

Other objects and purposes of this invention will be apparent to persons acquainted with apparatus of this general type upon reading the following specification and inspecting the accompanying drawings.

In the drawings:

FIG. 2 is a partially broken top view of the machine of FIG. 1.

FIG. 3 is an enlarged, partially broken sectional view taken on the line III—III of FIG. 2.

FIG. 3A is a fragmentary section taken on the line IIIA—IIIA of FIG. 3.

FIG. 4 is an enlarged fragment of FIG. 3.

FIG. 5 is a partially broken end view of the apparatus of FIG. 3 taken from the rightward or exit end thereof.

FIG. 6 is a sectional view substantially as taken on the line VI—VI of FIG. 5.

FIG. 6A is an enlarged fragmentary sectional view taken on the line VIA—VIA of FIG. 6.

FIG. 7 is a sectional view substantially as taken on the line VII—VII of FIG. 3.

FIG. 9 is a reduced, partially broken sectional view substantially as taken on the line IX—IX of FIG. 8.

FIG. 10 is a section taken on the line X—X of FIG. 9.

Figure 1:
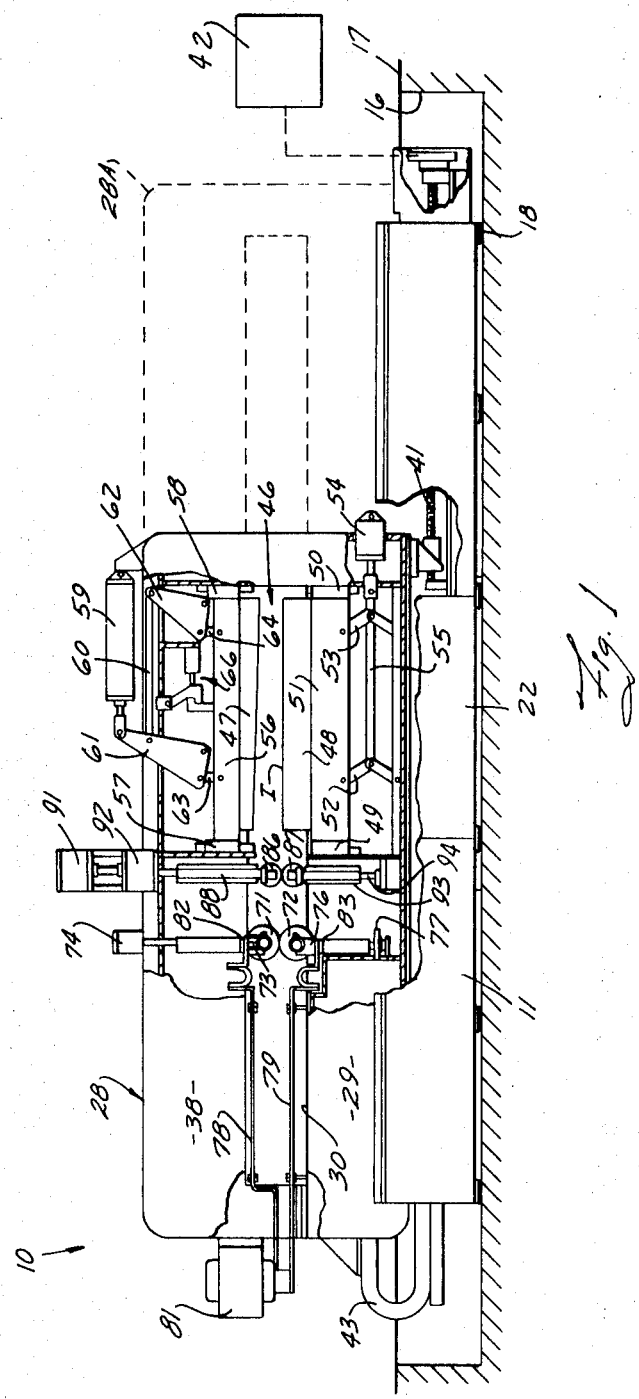
FIG. 1 is a partially broken side elevational view of a welding machine embodying the invention taken from the entry side thereof.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the net direction of strip flow through the machine, forwardly being the normal flow direction, such flow being from left to right as indicated by the arrow A in FIG. 3. The terms "operator side" and "drive side" will refer to the rightward and leftward sides, respectively, of the machine as indicated in FIG. 1. The words "inwardly" and "outwardly" will refer to directions toward and away from respectively, the geometric center of the machine and designated parts thereof. Further, the terms "tail end" or just "tail" will refer to the end of the outgoing strip, that is, the strip on the exit side of the machine. The term "head end" or simply "head" will refer to the approaching end of the incoming strip, that is, the strip on the entry side of the machine. The terms "entry" and "exit" will be applied to portions of the machine which a forwardly travelling strip will meet first and last, respectively.

GENERAL DESCRIPTION

In general, the objects and purposes of this invention are met by providing a strip end welding machine comprising a base upon which is slideably mounted a horizontally reciprocating, annular frame. The strips whose ends are to be welded pass axially through the frame transversely of its direction of reciprocation. The frame carries a shear for trimming the ends of the strips to be welded and welding and planishing rolls energizable for joining the overlapped strip ends. The machine includes bass-mounted clamps on either side of the frame for gripping the strip ends to be joined.

Each clamp includes a pair of pressure members, preferably an electromagnet and a bed of magnetic material disposed on opposite sides of the strip and to be clamped. The electromagnet is energizable for attracting the bed for tightly gripping the strip end therebetween. The pressure members are spaced from the welding zone and each carries a nose of nonmagnetic material which extends toward the welding zone and are spaced apart when said clamp is actuated to grip the strip and by a distance somewhat greater than the thickness of the strip end. The noses prevent buckling of the strip and between the welding zone and the pressure members. Means are provided for separating the pressure members of each clamp.

Each clamp is carried upon a carriage reciprocable along the axis of the adjacent strip to move the clamped strip toward and away from the welding zone. The carriage is slidably supported on guide means fixed upon a platform above the base. A cross slide is carried by the platform beneath the carriage for reciprocation transversely of the axis of the strip. Angle blocks having parallel edge contact surfaces disposed at an acute angle to the path of the cross-slide are carried thereby and slide with respect to wedge-shaped members fixed to the underside of the carriage. Thus, reciprocation of the cross-slide transversely of the strip effects a corresponding reciprocation of the carriage through the angle block and wedges in a direction parallel to the strip axis. Suitable table means support the platforms with respect to the base so as to locate one of the clamps on the entry side of the frame and one on the exit side thereof.

In operation the open entrance clamp is moved to its position closest to the welding zone. The head end is fed therethrough and preferably somewhat past the path of the welding rollers. The clamp then grips the head end and is retracted to a position remote from the welding zone to establish slack in the incoming strip. The head end is then trimmed. Thereafter, the entry clamp is returned to its position adjacent the welding zone to present the trimmed head end for welding. Means are provided to limit the extent of transverse movement of the entrance cross-slide and thereby establish the limits of the entrance clamp and are adjustable to allow a greater overlap thicker strips and a lesser overlap of thinner strips.

The platform on the entrance side of the machine is pivotally mounted on an axis spaced from the welding zone. Lift means are provided for pivoting the inner end of the platform upwardly on such axis to lift therewith the entrance clamp and to raise the head end of the entering strip above the tail end of the exiting strip so as to provide an overlap. The exit platform is pivotally secured to the table by a vertical bolt at one inner corner thereof and is loosely secured to the table at the remaining corners to prevent the platform from lifting off the table. Energizable means are provided for pivoting the platform to adjust the angle between the axes of the incoming and outgoing strips from an aligned position to a cocked position so that the overlap between the strip ends will increase in the direction of welding.

DETAILED DESCRIPTION a. Basic Structure

The welding machine 1 embodying the invention and illustrated in FIGS. 1-3, is intended for welding the head end of an incoming strip I (FIG. 3) to the tail end of an outgoing strip O aligned therewith. The machine 10 has a base 11 which extends perpendicularly to the strips I and O and is substantially centered therebeneath.

In the particular embodiment shown, the base 11 is supported on the bottom of a pit 16 in the floor 17 of the machine site by leveling shims 18. The base 11 includes relatively short forward and rearward extensions 21 and 22 substantially centered on opposite sides of the base 11. The base 11 is provided with a relatively deep channel 23 which opens upwardly and extends longitudinally thereof. Horizontally opposed, parallel ways 26 and 27 extend along the top of the base 11 and overhang the upper edges of the channel 23.

A vertically arranged, generally O-shaped frame 28 (FIGS. 1 and 3) has an elongated, horizontal lower portion 29 partially disposed in the channel 23. A plurality of longitudinally spaced mounting blocks are fixed to opposite sides of the lower portion 20 as indicated at 31 ad 32 (FIG. 3) opposite the ways 26 and 27, respectively. Vertical guide rollers 36 and horizontal guide rollers 37 are supported by each of the mounting blocks 31 and 32 and bear against the upper, lower and opposed faces of the ways 26 and 27 to constrain the O-frame 28 to movement longitudinally of the ways 26 and 27. The lower portion 29 (FIG. 1) extends above the base 11 and is surmounted by generally U-shaped, downwardly opening upper portion 38. The O-frame 28 thus has longitudinally extending opening 30 therethrough defined between the upper and lower portions 28 and 29 thereof through which the incoming strip I may pass.

The O-frame 28 is reciprocable along the ways 26 and 27 between a leftward limiting position shown in solid lines in FIG. 1 and a rightward limiting position shown in broken lines at 28A in FIG. 1. The O-frame 28 is here reciprocated by an elongated screw 41 disposed in the rightward end of the channel 23 and rotatably driven by a suitable motor schematically indicated at 42. A flexible cable holder carries control and power cables and hoses to the O-frame 28 from the base 11.

The O-frame 28 supports a shear 40 (FIG. 1) adjacent the rightward end thereof which has vertically opposed upper and lower blades 27 and 48 extended longitudinally of the O-frame 28. The length of the blades 47 and 48 corresponds to the width of the widest strip to be welded by the machine 10 which in the particular embodiment shown is about 80 inches. The blades 47 and 48 are supported for relative vertical movement for trimming the ends of the strips I and O. In the particular embodiment shown, for example, the lower blade 48 is secured to the top of a lower platen 51 vertically slideable on tracks 49 and 50 in the O-frame 28. Center folding links 52 and 53 each are pivotally fixed to the platen 51 and lower frame portion 29. The piston rod of a pressure fluid cylinder 54 connects through a drive bar 55 to the folding centers of the links 52 and 53 for unfolding and folding said links alternatively to move the blade 48 upwardly and downwardly, respectively.

The upper blade 47 is pendently supported from an upper platen 56 the ends of which are slideably mounted on tracks 57 and 58 for vertical sliding motion with respect to the O-frame 28. A pressure fluid cylinder 59 is mounted longitudinally of the O-frame 28 adjacent the rightward end thereof and above the upper platen 56. The piston rod of the cylinder 59 is reciprocable for pivoting longitudinally spaced bellcranks 61 and 62. Links 63 and 64 suspend the ends of the upper platen 56 from the bellcranks 61 and 62. Cranks 61 and 62 are made to operate in unison for parallel motion by a tie 60. Thus actuation of the cylinder 59 moves the upper blade 47 upwardly and downwardly. Alternatively, it is contemplated that the cylinder may be eliminated and replaced by further cylinders, not shown, mounted on the O-frame 28 for pushing directly downwardly on the upper plate 47, the bellcrank 61 and 62 and links 63 and 64 being retained for maintaining the blade 47 horizontal during its vertical movement. Coordinated actuation of the cylinders 54 and 59 will bring the blades 47 nd 48 forcibly together to trim the end of a strip disposed therebetween. In the embodiment of FIG. 4, the upper blade is essentially of rectangular cross section and the lower blade is generally U-shaped in section to provide two spaced shear planes, the ends of the incoming and outgoing strips being trimmed along the plane nearest thereto. If desired, a fail-safe latch 66 (FIG. 1) may be provided for safety purposes during maintenance to hold the upper platen in its uppermost position.

Vertically aligned welding roller electrodes 71 and 72 (FIG. 1) are disposed between the shear 46 and the leftward end of the frame 28 and move rightwardly with the frame 28 to engage and roll along the upper and lower sides, respectively, of the seam to be welded. In the particular embodiment shown, the upper welding roll 71 is supported upon a vertically reciprocable fork 73 energized by a pressure fluid cylinder 74 mounted atop the frame 28. The lower roller 72 is vertically adjustably mounted on a lower fork 76, the vertical position of which is controlled by a hand wheel 77. Bus bars 78 and 79 for supplying welding current to the rolls 71 and 72, respectively, extend from the forks 73 and 76 leftwardly along the upper and lower walls, respectively, of the opening 30 to the output terminals of a suitable current source, for example, a single phase welding transformer, a DC output motor generator or a transformer-rectifier unit, such as that shown in application Ser. No. 420,949, filed Dec. 24, 1964, now U.S. Pat. No. 3,361,951, and assigned to the same assignee as the present application, mounted upon the leftward and of the frame 28. Suitable insulation indicated at 82 and 83 is provided to isolate the bus bars 78 and 79 and the electrodes 71 and 72 from the frame 28.

Vertically aligned planishing rollers 86 and 87 are disposed between the shear 46 and welding rolls 71 and 72 for tightly gripping the welded seam therebetween for reducing the thickness thereof and smoothing same as the frame 28 moves along the seam. In the particular embodiment shown, the upper planishing roller 86 is rotatably supported upon a post 88 vertically slideably disposed with respect to the frame 28 for reciprocation by tandem pressure fluid cylinders 91 and 92. The lower planishing roller 87 is similarly supported upon a downwardly extending post 93 mounted upon the frame for vertical adjustment upon suitable rotation of an adjustment screw 94. In the particular embodiment shown, the central plane S (FIG. 3) of the shear is somewhat rearwardly offset from the common control plane W of the welding and planishing rollers.

The base extensions 22 and 21 (FIG. 3) carry upstanding entry and exit supports 96 and 97, respectively. The supports 96 and 97 carry entry and exit clamps 101 and 102, respectively, which extend into the O-frame opening 30 for gripping the head and tail ends, respectively, of the incoming and outgoing strips I and O, respectively.

Entry equipment generally indicated at 98 (FIG. 2) and exit equipment generally indicated at 99 extends away from the entry and exit supports 96 and 97, respectively, and among other functions, controls the transverse positioning of the strips I and O relative to each other and to the machine 10 described in detail in copending application Ser. No. 553,970, filed May 31, 1966. In addition, the entry equipment 98 supports a control panel 100 by means of which an operator can control the machine 10.

b. Cooking Mechanism

Turning first to the exit support 97 (FIGS. 3–7A), same includes a table 111 (FIG. 3) fixed on the base extension 21 adjacent the way 27. The table extends transversely beneath the outgoing strip O preferably somewhat beyond the edges thereof. The table 111 has a top 112 upon which are disposed a plurality, here three, of well-spaced slide bars 113 (FIGS. 5 and 6) which parallel the direction A of strip travel through the machine 10. A generally rectangular platform 116 is provided with slide bars 117 on the bottom wall 118 thereof. The slide bars 117 are located above the aforementioned slide bars 113 and rest thereupon to support the platform 116 upon and for horizontal sliding motion with respect to the table 111. The platform 116 is supported on the table 111 for pivotal movement with respect thereto such pivotal movement being controlled by cocking mechanism 120 described immediately below. More particularly the ends of the walls 112 and 118 extend beyond the remainder of the table 111 and platform 116 to form overlapping closely spaced flanges.

Vertical holes 121 (FIGS. 6, 6a and 7) are provided through the bottom wall 118, preferably at each corner thereof. Corresponding holes 122, vertically aligned with the holes 121, appear at each corner of the top 112. One of the holes through the bottom wall 118 is of reduced diameter and is indicated at 123. The reduced diameter opening 123 is preferably one of those adjacent the frame 28 and more particularly is the upper, right-hand hole of FIG. 6. Shoulder bolts pass downwardly through the openings 121 and 123 in the bottom wall 118, the enlarged diameter upper portion 126 thereof being loosely received within the openings 121 and snugly but rotatably received within the opening 123. Suitable washers 127 loosely surround the enlarged diameter portion 126 of the bolts 124 above and below the wall 118. The reduced diameter portion 128 of each shoulder bolt 124 is snugly received within the aligned one of the openings 122 in the wall 112 and extend therethrough, suitable washers 120 surrounding the reduced diameter portion above and below the wall 112. The washers 129 and wall 112 are tightly gripped between the shoulder 131 of the shoulder bolt 124 and a nut 132 threaded on the lower end thereof. The wall 118 is snugly gripped between the head of the nut 124 and the uppermost one of the washers 129 but such grip is loose enough to allow sideways movement of the bottom wall 118 with respect to the bolt 124 to the extent allowed by clearance between the enlarged portion 126 and the wall of the hold 121. The shoulder bolt disposed in the reduced diameter hole 123 will hereinafter be designated as pivot bolt 125 since the platform is pivotable thereabout.

The cocking mechanism 120 further includes a pressure fluid cylinder 134 (FIGS. 3, 5, 6 and 7) preferably located diagonally opposite the reduced diameter hole 123 in the bottom wall 118 of the platform 116. The pressure fluid cylinder 134 is pivotally supported at 136 upon a bracket 137 which extends forwardly from the forward face of the table 11 and is rigidly affixed thereto. The pressure fluid cylinder 134 extends substantially in alignment with the outgoing strip O toward the O-frame 28 along the end of the exit support 97. The piston rod 138 of the cylinder 134 has an extension 130 affixed thereto. A lever arm 142 is fixed to the bottom wall 118 of the platform 116 and extends leftwardly (FIGS. 3A and 6) therefrom above the table 111. The outer end of the lever arm 142 is pivotally affixed to the free end of the extension 139. Thus, reciprocation of the piston rod 138 of the cylinder 134 moves the lever arm 142 forwardly and rearwardly to pivot the platform 116 about the pivot bolt 125.

The leftward end (FIG. 6) of the bottom wall 118 of the platform 116 is notched as indicated at 143 between the shoulder bolts 124. Upstanding bosses 146 and 147 (FIGS. 3 and 6) are disposed on opposite sides of the lever arm 142 and are spaced therefrom. The bosses 146 and 147 are fixed to the upper face of the top wall 112 of the table 111 and extend upwardly therefrom into the notch 143. Preferably coaxial adjustment screws 148 and 149 extend through the bosses 146 and 147, respectively, to adjustably limit the swing of the lever arm 142 therebetween and, hence, to determine the orientation of the platform 116 at the ends of its swing. If desired, suitable abutment blocks may be provided on the arm 142 for contact with the screws 148 and 149, one of such abutment blocks being indicated at 151.

c. Clamp Reciprocating Mechanism

The exit support further includes a carriage 156 which is supported atop the platform 116 by suitable guide means generally indicated at 157 (FIGS. 3, 3A, 5 and 7) for reciprocation toward and away from the O-frame 28 in response to energization of reciprocation means generally indicated at 158.

In the particular embodiment shown, the guide means comprises a parallel pair of guide rods 161 and 162 aligned with the path of the strips I and O. The guide rods 161 and 162 are supported above the platform 116 by upstanding brackets one of which is indicated at 164. The brackets 164 are disposed adjacent the corners of the top of the platform 116 and are fixed to the ends of the guide conduits 161 and 162. The carriage 156 includes a plurality of bulkheads 166 which extend longitudinally thereof and to which are affixed cylindrical shells 167 coaxially telescoped over each of the guide rods 161 and 162. Suitable axial bearings 168 (FIGS. 3 and 4), here axial ball bearings, are provided within the shells 167 for engaging the periphery of the rods 161 and 162 whereby to support the carriage 156 for reciprocation along the guide rods 161 and 162 toward and away from the path of the welding electrodes.

The reciprocating means 158 comprises an elongated crossslide 171 (FIGS. 3, 3A, 5, 7 and 7A) which is snugly disposed for reciprocation in an upwardly opening slideway 172 recessed in the top of the platform 116. The slideway 172 extends longitudinally of the platform 116 from one end thereof to the other and is preferably substantially centered below the guide rods 161 ad 162. Cover members 176, 177, and 178 (FIG. 7) are spaced along the length of the slideway 172 and are fixed to the platform 116 for retaining the cross-slide 171 within the slideway 172. The cover members 176 and 178 are preferably disposed adjacent the ends of the slideway 172 and the cover member 177 is centrally disposed thereof. A pressure fluid cylinder 79 (FIGS. 3A, 5 and 7) is disposed at one end, here the leftward end, of the cross-slide 171 is disposed at one end, here the leftward end, of the cross-slide 171 in coaxial alignment therewith. The pressure fluid cylinder 170 is supported by a bracket 181 fixed to the adjacent end of the platform 116. The cylinder 179 has a piston rod 182 which is fixed to the leftward end of the cross-slide 171 whereby reciprocation of the piston rod 182 of the pressure fluid cylinder 179 will result in a corresponding reciprocation of the cross-slide 171 along the slideway 172.

Preferably identical, parallelogram-shaped angle blocks 186 and 187 are spaced between the cover members 176, 177 and 177, 178, respectively. THe angle blocks 186 and 187 are affixed to the cross-slide 171 by any convenient means, here including keys 188 aligned longitudinally of the cross-slide, for reciprocation therewith. The angle blocks each have contact surfaces 191 and 192 on opposite sides thereof which are parallel to each other and disposed at a small acute angle to the axis of the cross-slide 171, such angle being slightly less than 30° in the present embodiment. The contact surfaces 191 and 192 of the angle block 186 fit snugly between and slideably engage corresponding parallel contact surfaces 196 and 197 of a surrounding pair of wedge blocks 198 and 199 spaced respectively rearwardly and forwardly therefrom. Further wedge blocks 201 and 202, preferably identical to the blocks 198 and 199, are similarly snugly but slidably disposed against the contact surfaces of the angle block 187. The wedge blocks 198, 199, 201 and 202 are fixed by any convenient means such as screws, not shown, to the underside of the carriage 156. As a result, longitudinal movement of the cross-slide 171 and therewith the angle locks will displace the wedge blocks with the carriage 156 toward or away from the welding zone.

d. Clamp Mechanism

Turning now to the details of the exit clamp 102 (FIGS. 3, 4 and 5) supported on the carriage 156, same comprises a bedplate 206 of magnetic material disposed at the inner edge of the carriage 156. The bedplate 206 preferably extends through the length of the carriage 156. The bedplate 206 is recessed in a downwardly stepped portion 206 of the top of the carriage 156 so that the upper surface thereof is flush with the upper surface of the carriage 156. An electromagnet 207 (FIG. 4) covers the bedplate 206 and is energizable for magnetically attracting same with a high-force density over the surface thereof. In the particular embodiment shown, the electromagnet comprises a generally M-shaped core 209 having longitudinally arranged downwardly facing grooves 211 and 212 in each of which is disposed a plurality of electrical conductors 213 defining a coil through which current from any convenient source, not shown, may be passed to energize the electromagnet for attracting same to the bedplate.

The strip O when disposed between the energized electromagnet 207 and bedplate 206 is firmly gripped therebetween and thus held fixed with respect to the carriage 156. The clamp 102 has been found satisfactory for strips of either magnetic or nonmagnetic material. Moreover, the electromagnet has a sufficiently strong field that even relatively thick strip material may be clamped without serious loss of clamping force. In the particular embodiment shown, strip material 0.080 inch or more thick has been satisfactorily held by the clamp 102.

The inner edge of the electromagnet 207 is flush with the inner edge of the bedplate 206 and with the inner face of the carriage 156 with the clamp 102 in its innermost position nearest the weld zone, the electromagnet and bedplate are substantially spaced therefrom. Thus, the clamp 102 is at all times sufficiently spaced from the welding zone as to prevent changes in the inductance in the welding circuit due to the effect of the magnetic field of the clamp and hence to prevent any losses that might be generated by such field.

Preferably identical vertically opposed noses 215 and 217 are fixed to and extend the length of the inner walls of the magnet 207 and plate 206, respectively. The noses 216 and 217 are here of substantially L-shaped cross section having oppositely extending vertical flanges 218 and 219, respectively, which are affixed to the rear wall of the magnet 207 and to the rear walls of the bedplate 206 and carriage 156, respectively, by any convenient means such as screws not shown. The noses 216 and 217 have rearwardly extending, spaced horizontal flanges 221 and 222, respectively, The horizontal flanges 221 and 222 replaceable planar liners 223 and 224, respectively, defining the opposed faces thereof. The opposed faces of the noses 216 and 217, which in the particular embodiment shown are the opposed faces of the liners 223 and 224, are each slightly setback from the opposed faces of the magnet 207 and bedplate 206. As a result, a strip O tightly gripped between the magnet and bedplate will readily clear the noses. The inner ends of the liners 223 and 224 closely approach the path of weld rollers and preferably clear same by only a relatively small amount. Thus, the end of a strip O gripped in the clamp 102 will be prevented from buckling and thereby from shifting forwardly away from its desired position for welding by the close presence of the opposed surfaces of the noses 216 and 217 despite the relatively large distance between the welding zone and the magnet 207.

Pressure fluid cylinders 226 and 227 (FIGS. 5, 6 and 7) are vertically aligned and disposed at the opposite ends of the carriage 156 beneath the longitudinal axis of the magnet 207. Substantially rectangular brackets 228 and 229 (FIGS. 5 and 7) are fixed to the ends of the carriage 156 beneath the magnet 207 and pendently support the cylinders 226 and 227, respectively, rigidly on the carriage. The cylinders 226 and 227 have upwardly extending piston rods 231 and 232, respectively. Extension rods 233 and 234 are fixed to the upper ends of the push rods 231 and 232, respectively, and extend coaxially upwardly therefrom. The extension rods 233 and 234 are guided by bearings one of which is shown at 236 (FIG. 5) affixed to the brackets 228 and 229, respectively, for axial sliding motion. Ears 237 and 238 extend longitudinally from the ends of the magnet core 208 and are pivotally engaged by the upper ends of the extension rods 233 and 234. Thus, extension of the piston rods of the cylinders 226 and 227 raises the extension rods 233 and 234 and therewith the magnet core 208 when the latter is deenergized.

In its raised position, the core 108 is substantially spaced above the bedplate 206 as indicated in broken lines at 239 in FIG. 3.

e. Vertical Offset Mechanism

Figure 8:
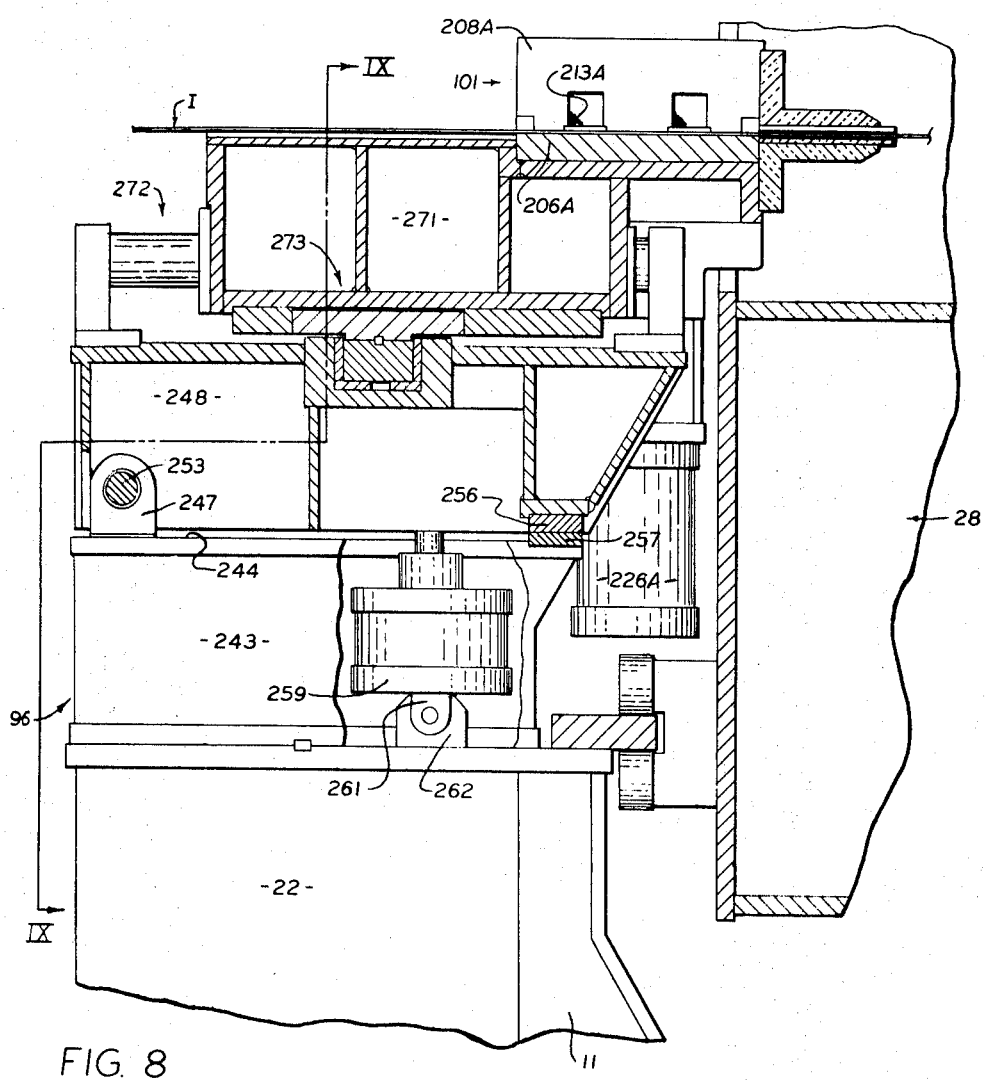
FIG. 8 is a partially broken, enlarged sectional view taken on the line VIII—VIII of FIG. 2.
Figure 7A:
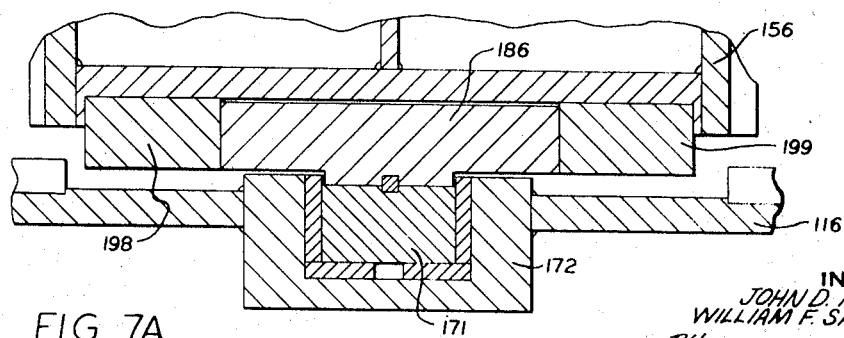
FIG. 7A is a fragmentary section taken on the line VIIA—VIIA of FIG. 7.
Figure 12:
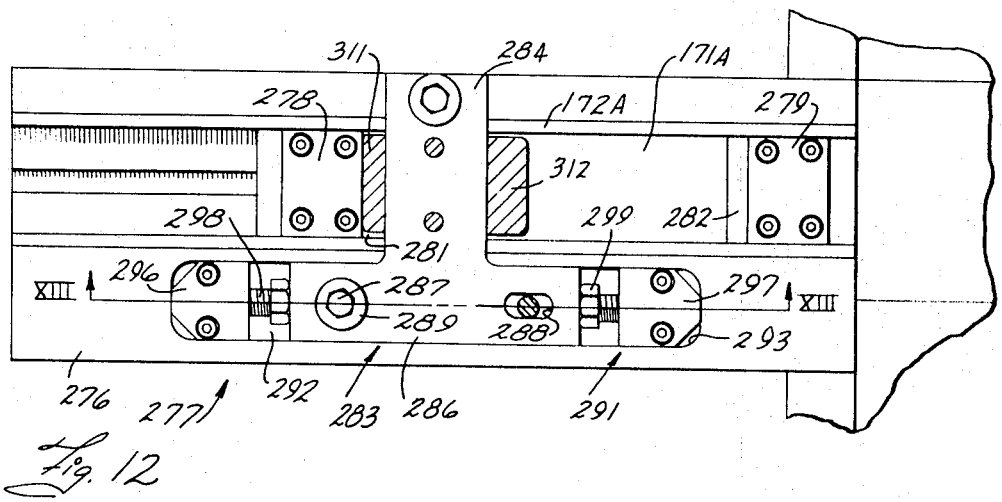
FIG. 12 is a sectional view substantially taken on the line XII—XII of FIG. 11.
Figure 13:
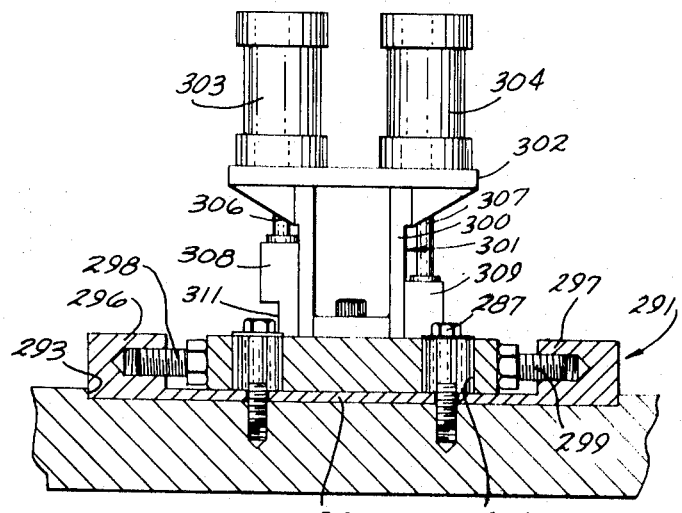
FIG. 13 is a sectional view taken on the line XIII—XIII of FIG. 12.
Figure 11:
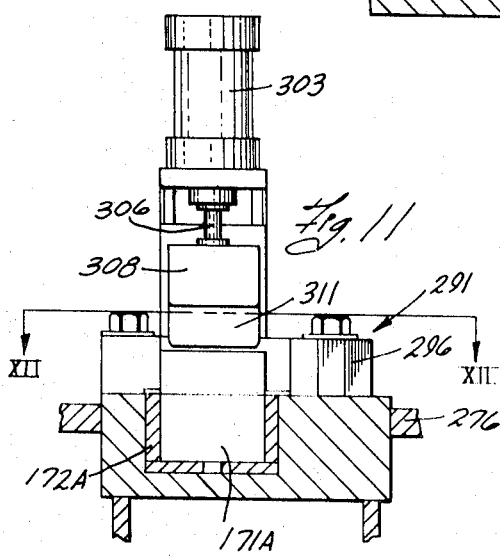
FIG. 11 is an enlarged sectional view taken on the line XI—XI of FIG. 10.

Turning now to the entry support 96 (FIGS. 3 and 8–13), same includes an upstanding pair of walls 242 and 243 (FIGS. 3, 8 and 9) spaced longitudinally of and fixed supported upon the entry base extension 22. The walls 242 and 243 extend horizontally from the outer edge of the base extension 22 to a point adjacent the way 26. Coaxial pivot bearings 246 and 247 are supported on the top surfaces 244 of the walls 242 and 243, respectively, adjacent the outer ends thereof.

The entry support 96 further includes a platform 248 which is disposed above the walls 242 and 243 and extends longitudinally therebeyond. The platform 248 includes an upper top surface 249 as well as a plurality of vertical, transversely extending bulkheads one of which is indicated at 251 diaposed beneath said top surface. Each of the pivot bearings 246 and 247 is loosely disposed between a pair of such bulkheads 251. The bearings 246 and 247 rotatably support pivot shafts 252 and 253, respectively which extend between and are rigidly affixed to the surrounding bulkheads 251 and the outer side of the platform 248 whereby the platform 248 is pivotally supported upon the bearings 246 and 247. Vertically aligned abutment blocks 256 and 257 are disposed on the underside of the platform 248 and upper surface 244 of the walls 242 and 243, respectively, adjacent the O-frame 28 for supporting the inner side of the platform 248.

Upstanding pressure fluid cylinders 258 and 259 are pivotally supported at the bottom ends thereof as indicated at 261 upon upstanding lugs 262 on the upper surface of the entry base extension 22. In the particular embodiment of the invention shown, the cylinders 258 and 259 are disposed adjacent to and between the walls 242 and 243. The cylinders 258 and 259 are spaced inwardly from the pivot bearings 246 and 247 toward the O-frame 28 and lie adjacent the inner ends of the walls 242 and 243. Said cylinders 258 and 259 have piston rods 263 and 264, respectively, extending upwardly between the bulkheads 248 terminated by devices 266 and 267, respectively, at the upper ends thereof. The devices 266 and 267 pivotally engage depending lugs, one of which is indicated at 268, which are fixed to the underside of the platform top.

Thus, extension of the pressure fluid cylinders 258 and 259 raises the inner side of the platform 248, the platform pivoting on the pivot bearings 246 and 247. Thus, the portion of the entry support 96 located above the platform 248 is pivoted to raise the entry clamp 101 from its normal lowermost position shown in the drawings. Thus, the head end of the incoming strip I can be raised above the tail end of the outgoing strip O to allow the strips to be overlapped and to avoid an endwise abutting thereof. Inasmuch as the head end of the incoming strip I need only be raised by an amount slightly in excess of thickness of the tail end of the outgoing strip O, which in the present machine is a small fraction of an inch, the stroke of the pressure fluid cylinders 258 and 259 may be relatively short and the resulting angle of inclination of the raised platform 248 need only be a few degrees.

An entry carriage 271 is supported for reciprocation toward and away from the O-frame 28 by guide means 272 carried by the platform 248. The entry carriage 271 is reciprocated by means 273. With certain exceptions noted hereinbelow, the detailed description of the exit carriage 156, guide means 157 and reciprocation means 158 given hereinabove will apply also to the entry carriage 271, guide means 272 and reciprocation means 273 as well as to parts thereof having corresponding parts described above. Thus, parts of the entry carriage 271, guide means 272 and reciprocation means 273 correspond to parts of the above-described exit carriage 156, guide means 157 and reciprocation means 158 will be referred to by the same reference numerals thereas with the suffix "A" added thereto.

It will be noted that the pressure fluid cylinders 179 and 179A of the reciprocation means 158 and 273 are both on the same side of the machine 10, that being the right side as viewed in FIG. 1. Further, the cylinder 179A (FIGS. 9 and 10) has a longer stroke than does the cylinder 179 and the contact faces 196A and 197A of the wedges 198A, 199A, 201A and 202A are longer than the corresponding contact faces of the corresponding wedges in the reciprocating means 158. Also, the contact surfaces 196A and 197A are sloped in the opposite direction, with respect to the path travelled by the strips O and I, as the surfaces 196 and 197. As a result, retraction of the piston rod 182A of the cylinder 179A results, as in the case of the cylinder 179, in inward movement of the carriage 271 toward the welding zone.

f. Overlap Adjustment Mechanism

The platform 248 extends as seen at 276 (FIGS. 9-13) substantially beyond the end of the carriage 271 on the end thereof opposite the cylinder 179A, that is, the leftward end in FIGS. 9 and 10. The platform extension 276 is relatively narrow and extends along and on both sides of the cross-slide 171A. The leftward and (FIGS. 9 and 10) of the cross-slide 171A and the extension 276 are equipped with coacting parts of an adjustable stop mechanism generally indicated at 277.

Figure 14:
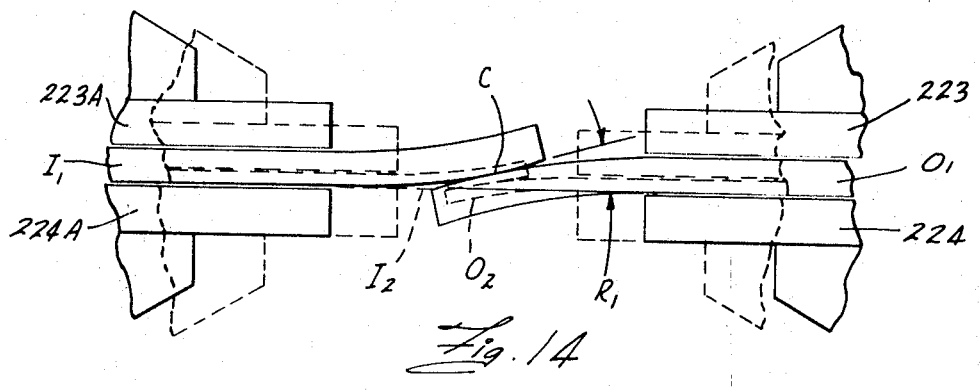
FIG. 14 is an enlarged fragment of FIG. 3 showing the head and tail strip ends positioned for welding.

The stop and overlap adjustment mechanism 277 allows the inward and outward limits of entry clamp movement to be changed by adjusting the limits of reciprocation of the cross-slide 171A. As a result, the spacing of the ends of the liners 223A and 224A from the trimmed end of the strip I, as well as the amount of overlap between the incoming and outgoing sheets as seen in FIG. 14, can be changed. Thinner strips, being normally less stiff than thicker strips, resist deflection over a lesser unsupported extent, as between the entry noses 291 the welding rollers, than would thicker strips. Also, the optimum overlap for a pair of thin strips may be substantially less than the optimum overlap for relatively thick strips.

Turning to the stop mechanism 277 (FIGS. 9, 10, 11, 12 and 13), the same includes a pair of spaced abutments 278 and 270 affixed to the upper surface of the cross-slide 271A. In the particular embodiment shown, the abutments 278 and 279 are faced with suitable shims 281 and 282 removably affixed thereto by any convenient means such as screws, not shown. A T-shaped member 283 is fixed atop the extension 276. The T-shaped member 283 has a log 284 which extends across and above the slideway 172A in which the cross-slide 271A is reciprocably disposed. The T-shaped member 283 also has an elongated head portion 286 paralleling the slideway 172A preferably on the outer or rearward side thereof. The head portion 286 of the T-shaped member 283 rests upon the base 202 of a limit fixture 291 (FIGS. 11 and 13) recessed at 293 in the top of the extension 276. The T-shaped member 283 is affixed to the extension 276 preferably by means of screws 287 which in the particular embodiment shown pass through holes 288 in the T-shaped member which are elongated in the axial direction of the slideway 172A. Large washers 289 are disposed between the heads of the screws 287 and the T-shaped member 283. Thus, by loosening the screws 287, the T-shaped member 283 can be shifted axially along the slideway 172A to properly adjust the position thereof. The limit fixture 291 has upstanding blocks 296 and 297 at the opposite ends thereof, the opposed faces of which threadedly receive adjustment screws 298 and 299 which extend therefrom toward each other and are preferably coaxial. The heads of the screws 298 and 299 engage the adjacent ends of the head portion 286, adjustment of the screws 298 and 299 providing a highly precise adjustment of the head portion 286 axially of the extension 276.

An upstanding generally rectangular framework 301 rests atop the leg 284 and is preferably centered above the slideway 172A. The framework 301 has upstanding walls 300 spanning the slideway 172A and an overhanging top 302 which extends axially of the slideway 172A. Upstanding pressure fluid cylinders 303 and 304 are fixed upon the top 302 adjacent the ends thereof and have depending piston rods 303 and 307 which extend downwardly through suitable openings in the top 302 adjacent the sidewalls 300 of the framework 301. Generally rectangular abutment shoes 303 and 309 are rigidly affixed to the lower ends of the piston rods 306 and 307, respectively. The surfaces of the abutment shows facing away from the framework 301 are relieved adjacent the lower ends thereof to form abutment portions 311 and 312. Thus, when the piston rods 306 and 307 are extended, the corresponding abutment portions 311 and 312 are inserted between the leg 284 and the opposed shims 281 and 282, respectively. This shifts the limits of travel of the cross-slide 171A by an amount equal to the thickness of the interposed portions 311 and 312, and by a proportionate amount, determined by the angle of the angle blocks 186A and 187A, shifts the limits of reciprocation of the entry clamp 101. Normally the shoes 308 and 309 are lowered alternatively to effect a finite shift in the orbit of the entry clamp and thereby a finite shift in the unsupported length of the head end extending from the entry noses to the welding roll path. Thus, simply by reversing the positions of the shoes 303 and 309, the inner end of the entry nose travel may be set near the welding roll path for thin strips or further from the welding roll path for thick strips without changing the length of the nose travel. The screws 298 and 299 may be used to effect a fine adjustment of the entry clamp orbit, again without changing the length thereof, to complement the gross adjustment of orbit position effected as above described by alternative lowering of the shoes 308 and 309.

On the other hand, exchanging the shim 282 for another of different thickness will alter the trimmed length of strip and extending from the entry noses and, hence, for a given setting of the screws 298 and 299 and shoes 308 and 309, will alter the amount of overlap between the head and tail strip ends.

OPERATION a. Preweld operation

The machine 10 was developed to quickly and reliably overlap weld the end of succeeding relatively thin strips of steel, the resulting strip being uniform with narrow limits throughout its length and hence through the welded joints.

Turning now to a preferred mode of operation of the machine 10 (FIGS. 1, 2 and 3), with the clamps 101 and 102 open, the upper weld and planishing rolls raised and the rest of the machine 10 generally positioned as shown in the drawings, the tail end of an outgoing strip 0 is drawn forwardly through the opening 33 of the O-frame 28 by any convenient means, not shown. The tail end of the outgoing strip O continuous to move forwardly through the machine 10 until it nears the exit side of the open shear 40 at which point it is stopped by any convenient means, not shown, preferably controlled from the operator's instrument panel 100 mounted on the machine 10. When the tail end stops, the exit clamp 102 is closed by retracting the piston rods of the exit clamp cylinders 226 and 227. With the outgoing strip 0 thus snugly disposed between the core 209 (FIG. 4) and the bedplate 206, energization of the electromagnet 207 attracts same to the bedplate 206 thus clamping the tail tightly therebetween. The liners 223 and 224 of the clamp noses 216 and 217 are spaced slightly from cylinders strip 0 being clamped to limit displacement thereof vertically and, hence, to prevent buckling thereof during shearing or welding.

With the clamping of the tail completed, the shear 46 is energized. Thus, the cylinders 54 (FIG. 1) and 59 move the upper and lower blades 47 and 48 together to trim the excess length from the tail of the outgoing strip 0. The shear is then opened.

If the waste from the strip tail is longer than the distance between the shear planes of the shear 46, the usual waste piece will be deposited between the edges of the lower blade 48 and an additional waste will fall on the entry side of the shear 46, such waste being subsequently removed by the operator.

Figure 15:
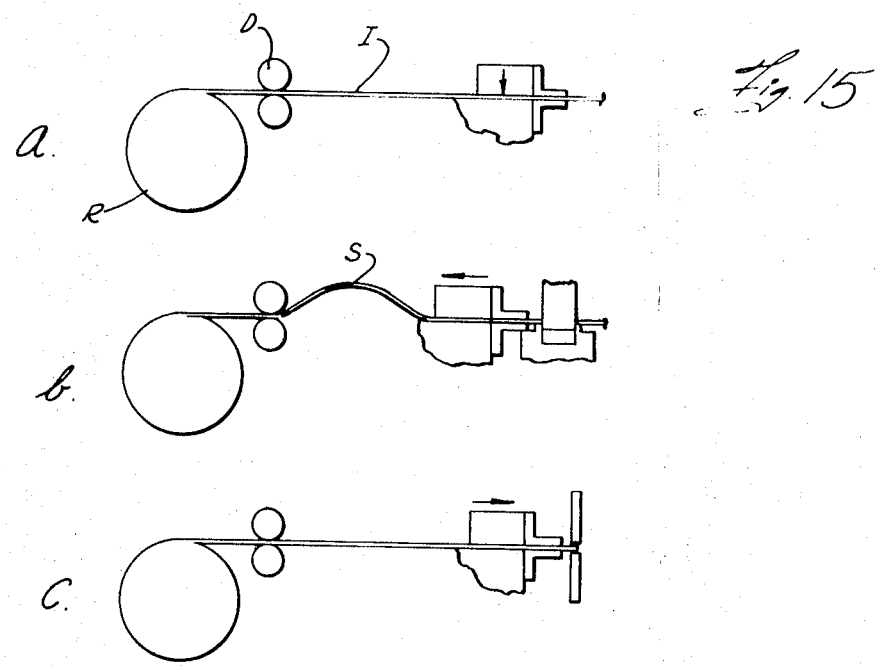
Fig. 15 is a schematic diagram showing the operation of the entry clamp in locating the head end of the entry strip for shearing.

The head end of an incoming strip I (FIG. 3) preferably fed from a suitable roll R (FIGS. 3 and 15) by any convenient means such as conventional drive rollers D is jogged across the top of the entry carriage 271, through the open entry clamp 101 and shear 46 and past the trimmed end of the outgoing strip 0. Prior to or during the aforementioned movement of the strip head toward the trimmed tail, the carriage 271 is caused to rise somewhat so as to allow the head to overlap the tail of the outgoing strip without interfering therewith. This overlapping is accomplished by energization of the lift pressure fluid cylinders 258 and 259 (FIG. 9) the resulting extension of which raises the inner portion of the platform 248 and pivots said platform about the axes of the pivot bearings 246 and 247. The upward pivoting motion of the platform 248 results in the required rise of the head carried thereby. After the head has overlapped the tail by the desired amount, the pressure fluid cylinder, 258 and 249 are deenergized thereby allowing the piston rods 263 and 264 thereof to fall. As a result, the platform 248 pivots downwardly to its normal lowermost position shown in FIG. 8 and allows the head to rest on the trimmed tail. Suitable means, preferably the exit equipment 99, (FIG. 4) detects the position of the drive side edge of the clamped and trimmed outgoing strip and as disclosed in the above-mentioned application Ser. No. 553,970 causes the entry equipment 98 to position the head of an incoming strip I transversely, whereby the incoming strip I is precisely axially aligned with outgoing strip o.

The entry clamp pressure fluid cylinders 226A and 227A (FIG. 8) are then energized to lower the core 208A against the head end lying on the bedplate 206A. The electromagnet windings are thereafter energized and the clamp 101 thus firmly grips the incoming strip I.

Thereafter, the entry clamp 101 with the head of the incoming strip I is retracted rearwardly away from the welding zone which results in a certain amount of slack in the incoming strip I as generally indicated at 5 in FIGS. 3 and 16. More particularly, the entry cross-slide cylinder 179A is energized to extend its piston rod and thus to move the cross-slide 171A leftwardly as seen in FIGS. 9 and 10. The leftwardly moving angle blocks 186A and 187A, carried by the cross-slide 171A, slide along the contact surfaces 197A of the wedge members 199A and 202A and move same away from the welding zone to thereby move the carriage away from the welding zone. The head, held by the clamp 101, is therefore also moved away from the welding zone. Upon such retraction of the entry clamp and head, the sheer 46 is once again closed, the blades 47 and 48 thereof trimming the head end of the strip I.

After the shear 46 opens, the entry cross-slide cylinder 179A is reversed to move the carriage 271, entry clamp 101 and the head back toward the welding zone. Again the carriage 271 is caused to rise as the head moves forwardly to allow same to overlap the tail. When the head reaches its forward limit of motion determined by the stop mechanism 277, the carriage 271 drops.

b. Strip Overhang Adjustment

It will be noted that as the entry clamp 101 is dropped to its lowermost position as above described, the head end of the incoming strip I is curved upwardly at an angle $R_1$ (FIG. 14) as it strikes the upper surface of the tail. Correspondingly, the tail would normally be carved downwardly by substantially the same amount. The clamp nose liners 223, 224 and 223A, 224A prevent significant deflection of the portions of the strips therebetween, most of the deflection of the strips thus being between the ends of the entry and exit clamp liner pairs.

If the entry and exit clamps are too close, the angle $R_1$ tends to become excessively large, particularly for thicker strips, and the elastic limit of the head and tail is exceeded. In such case, the head and/or tail will fold sharply so that one or more creases will appear in the concave sides thereof. Such creases are not removed in the welding and planishing processes and thus render the finished strip defective.

On the other hand, if the entry and exit clamps are spaced too far apart, the unsupported portions of the strips therebetween, particularly in thinner strips, will tend to buckle during welding. As a result, it is desirable that the entry and exit clamps be placed relatively close together for thin strips to provide adequate support and less close together for thicker strips so as to avoid creasing.

Thus, for the relatively thin strips indicated $I_2$ and $O_2$, the clamp noses preferably are disposed close together as indicated in dotted lines in FIG. 14, which positions correspond to the location of the entry and exit clamps 101 and 102 in the remaining FIGS. However, when relatively thick strips, such as those indicated in the solid lines in FIG. 14 at $I_1$ and $O_1$ are being overlapped, entry and exit clamps 101 and 102 are preferably located somewhat farther from the welding zone and from each other, than is shown in FIGS. 3–10. Such adjustment of clamp position for welding would normally be carried out by the operator prior to the steps of operation above described.

Retraction of the exit clamp from the welding zone is readily carried out by energization of the cylinder 179 (FIG. 7) to extend its piston rod 182 and therewith the cross-slide 171 rightwardly. Rightward movement of the cross-slide 171 slides the angle blocks 186 and 187 fixed thereto along the contact surfaces 198 and 197 of the wedge blocks 193, 199 and 201, 202 fixed to the exit carriage 156 to move said carriage, and therewith the exit clamp 102, away from the welding zone.

It will be noted that the travel of the exit carriage 156 is substantially shorter than the travel of the entry carriage 271. In fact, the travel of the exit carriage 156 is preferably equal to the rearward shift of the orbit of the entry clamp 101 (FIGS. 8 and 9) resulting from a reversal of the positions of the shoes 308 and 309 of the stop mechanism 277.

When the exit clamp is retracted from the welding zone for properly gripping a thick strip, the orbit of the entry clamp 101 is preferably also shifted away from the welding zone, thereby shifting the inner end of such orbit away from the welding zone. The shoes 308 and 309 of stop mechanism 277 as shown in FIGS. 9 and 10 are arranged to place the entry clamp orbit in its position nearest the welding zone. To shift the entry clamp orbit outwardly a step, the cylinder 303 is energized to drop the shoe 308 and the cylinder 304 is energized to raise the shoe 309. Appropriate concurrent jogging of the cross-slide 171A by cylinder 179A moves the abutment 278 leftwardly away from the leg portion 284 to allow the shoe 303 to freely drop between such leg and the shim 281. Subsequently, the cross-slide 171A may be returned rightwardly to its now limiting position determined by the shoe 408. Thus, when the shoes 308 and 309 move to new positions opposite those shown in the drawings, the orbit of the cross-slide 171 is shifted rightwardly (FIGS. 9 and 10) by the thickness of the lower portion 311 and 312, and the orbit of the entry clamp is shifted rearwardly as intended.

As mentioned above, adjustment of the entry clamp orbit position is not limited to the two spaced locations provided by reversing the shoes 308 and 309. A continuous fine adjustment of the entry clamp orbit position between and beyond those two locations may be had by loosening the screws 187 of the stop mechanism 277 and shifting the T-member 283 forwardly or rearwardly by adjusting the screws 293 and 299. Normally, however, once in initial adjustment of screws 298 and 299 has been made, the gross two-position adjustment allowed by reversal of shoes 308 and 309 will suffice to cover the normal range of strip thicknesses handled by the machine 10.

Referring again to FIG. 14, optimum amount of overlap of the head and tail normally is directly related to the thickness thereof. Too much overlap relative to strip thickness is undesirable since it produces a weld seam of large cross-sectional area which cannot readily be planished to a thickness substantially equal to the rest of strips. Too little overlap relative to strip thickness, on the other hand, may allow the head to slip off the tail during welding producing a defective seam or none at all. Thus, it is desirable that the machine 10 be adjusted, prior to feeding of the strips thereto, to provide the proper overlap for the strip thickness to be handled. Assuming the apparatus 177 (FIG. 12) as shown to be adjusted for proper thin strip overlap, same can be adapted to thick strips i.e., greater overlap, by replacement of the shim 281 by a thinner one or by complete removal thereof. Such moves the leftward limit of the cross-slide 171A farther leftwardly and, hence, moves the forward limit of the entry clamp nearer the tail so as to increase head-tail overlap. Since the shim 282 has not been changed, the rearward limit of the clamp travel is unchanged and therewith the overhang of head from entry clamp.

Alternatively overhang can be increased by leaving the shim 281 alone and shortening the shim 282 in effect by omission or replacement. This leaves the clamp-weld roller distance unchanged at welding but lengthens the clamp shear distance at trimming thus producing a longer head-clamp overhang and thereby a greater head-tail overlap. Whether it is the shim 281 or the shim 282 that is adjusted, it is an elongation of the entry clamp orbit which effects an increase in head-tail overlap. Conversely, reduction of head-tail overlap may be effected by reduction of entry clamp orbit length, as by increasing the length of the shims 281 and 282. Normally the magnitude of the elongation or contraction of the orbit will be a small fraction of the shift or orbit desired for a typical shift from thick stock to thin stock or vice versa. Also a rather close relationship of head-tail overlap to thickness may be required where provision of one head-clamp overhang setting for "thick" strips of quite widely varying thickness and just one other overhang setting for any thinner strips may be satisfactory.

c. Welding and Planishing

Once the sheared head and tail ends are overlapped, the O-frame 28 is energized through the screw 41 and motor 42 to move toward the operator, that is, to the right in FIG. 1, in order to move the shear 46 past the strips I and O and move the welding rollers 71 and 72 theretoward, During such movement, the weld cylinder 74 is energized to move the normally raised upper welding electrode 71 downwardly toward the lower roller 72 and maintain a predetermined pressure on the seam formed by the overlapped head and tail located therebetween. The weld current source 81 is energized by this time and through bus bars 78 and 79 energizes the welding electrodes 71 and 72. The welding electrodes roll along and weld together the overlapped strip ends as the O-frame 28 continues to move rightwardly. After completion of welding, the source 81 is deenergized and the cylinder 74 reversed to raise the upper electrode 71.

The direction of motion in the O-frame 28 is then reversed and the planishing cylinders 91 and 92 are energized to urge the planishing wheel 86 downwardly into contact with the weld seam at its rightward (FIG. 1) end. The planishing rollers 86 and 87 exert sufficient force upon the freshly welded seam to flatten same substantially to the thickness of the rest of the strips 1 and O. As the O-frame 28 moves the planishing wheels off the leftward (FIG. 1) end of the weld seam, cylinders 91 and 92 raise the upper planishing wheel 86. The leftward motion of the O-frame continuous until it has returned to its rest position shown in solid lines in FIG. 1, The clamps 101 and 102 (FIG. 3) then open and the welded strip is free to move forwardly therethrough in response to any convenient motive power source, not shown, Thus, the machine 10 is left in a rest condition to repeat the cycle above described when the tail of the strip I moving therethrough appears.

d. Compension for Overlap Runout in Wide Strip Welds

Where the strips to be welded are relatively wide, i.e., a few feet or more in width and particularly cases where the overlap provided between the head and tail is relatively small, i.e., approximately the same as the thickness of the strips being joined, it has been found that as the welding rollers progress along the seam of overlap in front thereof gradually lessons. For example, wide strip ends initially uniformly overlapped by 0.050 inch prior to welding have been found to retain that overlap at the first welded end of the seam but lose as must as 0.020-inch overlap i.e., 20 percent at the last welded end of such weld seam. Such large percentage overlap runout has heretofore not been a problem since prior machines handling relatively narrow strips which did not exhibit such runout in overlap during welding.

It is to correct for this runout in wide strips that the exit platform 116 (FIGS. 5 and 6) is mounted for pivotal motion upon the exit table 111. This, when relatively wide strips are to be welded, the pivot cylinder 134 is energized after the tail is firmly clamped. The cylinder 145 moves the lever 142 outwardly away from the welding zone to cock the tail by a small amount. The displacement of the lever 142 is chosen to provide an outward displacement of the leftward (FIGS. 6 and 7) edge of the tail by a distance equal to the anticipated runout in the weld seam. Thereafter, the tail is trimmed as above described, but due to the counterclockwise pivotal displacement of the platform 111 about the pivot screw 125, at a slight angle T. Thereafter, cylinder 134 is energized to return the tail to its original uncooked position. As a result, the trimmed tail extends somewhat farther toward the weld zone on its leftward side than on its rightward side as shown in FIG. 6. When the head and tail are overlapped, there will be the normal desired amount of overlap on the side first to be welded and substantially more overlap on the last side of the strips to be welded, the extra overlap being equal to the contemplated runout. In Consequence, as the overlap runs out ahead of the advancing welding rolls, a uniformly overlapped seam is produced. It should be noted that joined as above described, the head and tail are longitudinally aligned after welding.

An alternate, though somewhat less desirable method of compensating for overlap runout, also makes use of the pivot cylinder 134. In this alternate method, however, the tail is clamped and trimmed prior to cooking thereof and is cooked, by extension of the cylinder 134 immediate prior to welding. As a result, the edge of the tail last to be welded will be overlapped by the head by an amount in excess of the desired welded overlap. Runout of the excess overlap during welding results in a finished seam of constant overlap throughout its length. However, this alternate method produces a composite strip in which the welded head and tail are not longitudinally aligned but are skewed slightly with respect to each other.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a clamp positioning mechanism in a strip welding machine, the combination comprising:
    a platform;
    slide means and means supporting said slide means for reciprocation on said platform; means for reciprocating said slide means;
    first means defining at least one contact surface fixed with respect to said slide means and arranged at an acute angle to the path of said slide means;
    a carriage for supporting said clamp;
    guide means on said platform for supporting said carriage for movement transversely of said slide means;
    second means defining at least one further contact surface fixed with respect to said carriage and slideably engaged with said contact surface on said slide means for causing said carriage to reciprocate along said guide means in response to reciprocation of said slide means on said platform.

2. The device defined in claim 1 including means for limiting the travel of said slide means to a preselected length and position.

3. The device defined in claim 2 in which said limiting means includes a pair of spaced abutments fixed with respect to said slide means and a stop bar disposed loosely between said spaced abutments and fixed with respect to said platform for limiting engagement with alternative ones of said abutments.

4. The device defined in claim 3 including at least one stop block and mean energizable for inserting said stop block between said stop bar and one of said spaced abutments for changing the limiting position of said slide means.

5. The device defined in claim 3 in which said slide means comprises an elongated cross slide member disposed in a slideway on said platform for reciprocation therealong, said abutments are located atop said cross-slide said stop bar is located above said slideway:
    including an upwardly extending frame mounted upon said stop bar; and
    in which one of said stop blocks is provided at the side of said frame facing each of said abutments and said means for energizing said stop blocks comprises a pair of pressure fluid cylinders mounted on said frame and each having a piston rod extending downwardly along the side of said frame for connection to a corresponding stop block, whereby energization of each said pressure fluid cylinders drops the corresponding one of said stop blocks along said frame to a position abutting said stop bar and facing a corresponding one of said abutments.

6. The device defined in claim 3, in which said stop bar includes an elongated crosshead at one end thereof extending along said slide means and means alternatively actuable for allowing controlled movement of stop bar along said slide means and for fixing same with respect to said platform; and including screw adjustment means supported at either end of said crosshead on said platform, such screw adjustment means being adjustable longitudinally of said crosshead and engageable with the opposite ends thereof, simultaneous adjustment of said screws in the same direction causing an adjustment of the longitudinal position of said stop bar with respect to said slide means and thereby a shift of the orbit of said clamp.

7. The device defined in claim 1, in which said slide means comprises an elongated slide member extending substantially the length of said platform and said means reciprocably supporting said slide means comprises a guideway in the top of said platform for snugly receiving said slide means therewithin;
    said first contact surface defining means comprises at least one parallelogram-shaped member fixed on said slide member and having parallel opposite side edges angled with respect to said slide member, each of said opposite side edges defining one of said contact surfaces;
    said second means comprises a pair of wedge-shaped blocks affixed to the underside of said carriage and having opposed parallel edges snugly but slideably engaging said opposite sides of said angle blocks, at least along a portion of the length thereof;
    whereby movement of said angle block in one direction causes one of said side edges to urge one of said wedge blocks in a direction transversely away from said slide member and movement of said angle block in the opposite direction and causes said other side edge thereof to urge the other of said wedge blocks in the opposite direction transversely of said slide member.

8. The device defined in claim 7, in which two of said angle blocks are affixed to said slide member at longitudinally spaced locations thereon and a pair of wedge blocks are mounted on the underside of said carriage at each of said locations, each of said wedge pairs sandwiching a corresponding angle block therebetween.

9. The device defined in claim 1, in which the device for reciprocating said slide means comprises a pressure fluid cylinder supported on said platform and having an extensible piston rod axially aligned with said slide means and fixed with respect thereto for reciprocating same.

10. The device in claim 3, including shims removably affixed to the opposed faces of said pair of spaced abutments for determining the length of travel of said slide means.

11. In an apparatus for overlapping one of a pair of oppositely extending strips on the other thereof, said strips being arranged for lap welding in a strip end welding machine, the combination comprising:
    means for supporting one of said strips:
    a fixed table;
    a platform disposed above table and below the other of said strips;
    means for pivotally supporting said platform on said table on the side of said platform remote from said one strip for pivotal motion about an axis transverse to said other strip;
    limiting means for supporting the other side of said platform with respect to said table for maintaining said platform generally in a horizontal condition;
    means secured between said table and said platform adjacent said other edge energizable for raising said other side of said platform so as to pivot the platform about said pivot axis;
    whereby such pivotal motion of said platform with respect to said table results in the raising of the end of said other strip above the end of said one strip to allow overlapping thereof.

12. The device defined in claim 11, in which the pivot means includes bearings fixed on said table adjacent the opposite ends of said platform and shafts rotatably supported upon said bearings fixed to the underside of said platform;
    said energizable means comprises a pair of pressure fluid cylinders disposed in spaced relation transverse of said other strip, recessed with respect to the upper surface of said table and having piston rods pivotally fixed to the other side of said platform at locations spaced transversely of said strip, said pressure fluid cylinders being pivotally mounted with respect to said table and disposed longitudinally of said other strip between said pivot means and said supporting means.

13. In an apparatus for cooking one of a pair of oppositely extending strips clamped for end lap welding in a strip and welding machine, the combination comprising:

a fixed table;

a platform with respect to which the one strip may be clamped and means slideably supporting said platform on said fixed table;

means for maintaining said platform snugly against said table;

means for pivotally securing said platform to said table for pivotal movement about an axis perpendicular to the plane of sliding movement of said platform with respect to said table;

means energizable for pivoting said platform about said pivot means with respect to said table;

means actuable for adjusting the limits of such pivotal movement;

whereby pivotal movement of said platform with respect to said table results in cocking of the one strip with respect to the other strip.

14. The device defined in claim 13, in which said means maintaining said platform snugly against the table comprises a plurality of screws fixed to one of said platform and table and disposed in loosely surrounding holes in the other of said platform and table;

said means for pivotally securing said platform to said table comprises a further screw fixed to one of said platform and table and pivotable with respect to the other thereof;

said means energizable for pivoting said platform comprises a pressure fluid cylinder disposed on the opposite side of said table and platform from said pivot means and aligned generally parallel to the length of the strip to be cocked and a beam fixed to said platform pivotally engaging the piston rod of said pressure fluid cylinder, said beam extending transversely to the path of said strip to be cocked; and said actuable means comprise an opposed pair of screws disposed on opposite sides of said beam and threadedly supported upon said table, said screws being threadable toward and away from said beam to limit pivotal motion thereof about said further screw.

* * * * *